United States Patent Office 3,726,665
Patented Apr. 10, 1973

3,726,665
SLAGGING IN BASIC STEEL-MAKING PROCESS
William J. Minnick, Cheltenham, Pa., assignor to
C. & W. H. Corson Inc., Plymouth Meeting, Pa.
No Drawing. Original application Oct. 15, 1969, Ser. No. 866,727, now Patent No. 3,645,719. Divided and this application Oct. 18, 1971, Ser. No. 190,410
Int. Cl. C21c 5/54
U.S. Cl. 75—30
20 Claims

ABSTRACT OF THE DISCLOSURE

In a basic steel-making process wherein dolomite is charged as a slag-forming ingredient, the improvement wherein dolomite, prior to its charging, is intimately mixed with iron oxide in defined proportions, and formed into shaped bodies. In one preferred embodiment, the intimate mixture is pre-reacted, by heating, to convert the calcium oxide portion of the mixture into dicalcium ferrite with or without conversion of magnesium oxide to magnesio ferrite. Compositions for addition to a basic steel-making furnace in the form of preformed bodies of an intimate mixture of dolomite and iron oxide or the stated ferrite or ferrites resulting from the aforesaid pre-reaction, are also provided.

This application is a division of my co-pending application Ser. No. 866,727, filed Oct. 15, 1969, now Pat. No. 3,645,719.

BACKGROUND OF THE INVENTION

The availability of inexpensive oxygen has provided the steel-making industry with a new tool which it can use to accelerate many of the sluggish reactions which in the past accounted for low outputs. Although the idea of using oxygen instead of air to refine steel by a pneumatic process goes back to the 19th century, its use on a commercial scale did not begin in the United States until 1954; with the advent of the basic oxygen furnace. Due to the many advantages of the basic oxygen process, it has not become the major method of steelmaking to date.

The basic oxygen furnace consists of a steel shell lined with a refractory layer. Following the addition or charging of the raw materials to the furnace, a jet of oxygen gas is blown onto the hot metal. The oxygen reacts with the impurities in the raw materials, principally silicon, manganese, phosphorous, sulfur and carbon, as well as with the iron, to form oxides. These oxidation reactions generate a large amount of heat and represent the main, if not the only, source of heat in the process. Following oxidation, the oxide impurities float to the top of the melt forming a slag. Once the impurity slag layer has completely formed, it is separated from the underlying metal. The metal is then subsequently poured from the vessel.

Controlling the slag composition is of great importance in obtaining the desired steel. The importance of maintaining a basic slag is well known in view of the widespread use of magnesia-based refractory linnings in the furnace which would be rapidly attacked by an acidic slag. During the initial part of the heat, the silicon and manganese are rapidly oxidized forming acidic oxides which float on the top of the metal. The carbon oxidation, on the other hand, is slow to start and reaches its greatest velocity only after the silicon has nearly been completely oxidized. In addition, the oxidation of the sulfur and phosphorous is greatly enhanced by a highly basic slag. In order to obtain a basic slag, lime has been added (the term "lime" as used herein without further qualification refers to $CaCO_3$ or $CaO$), the former used in open hearth furnaces and the latter in the more modern steel-making processes utilizing, for example, the basic oxygen and electric furnaces. Lime is also added to promote fusion of the slag thereby causing the slag to remain in a fluid state.

Although lime has been used for years as a flux in all types of steel-making processes, with the great emphasis now being placed on shorter heat times, steel makers are aware of a major disadvantage in using lime. The rate of refining is largely dependent on the speed with which a highly basic slag is formed which in turn is dependent upon the rate of dissolution of the basic materials. Lime has a limited rate of dissolution in the slag for three major reasons. In the first place, particles of lime in the slag often react with silica forming a coating of dicalcium silicate around the lime particle. The early formation of this dicalcium silicate is highly detrimental since it forms a refractory coating around the lime particle, preventing it from going into solution and, in effect, deactivating it. In the second place, lime has a high melting point (about 2600° C.) which is far above steel-making temperatures (in the vicinity of 1600° C.). This implies that in order to dissolve lime in the slag, it must first react with one or more ingredients of the slag to form a lower melting material, all of which requires time. In the third place, over-burned lime is dissolved very slowly in the slag of a basic oxygen furnace, but the use of under-burned lime presents difficulties since its carbonate core must undergo time-consuming calcination in the furnace. In attempting to compensate for this problem due to the slow dissolution of the lime, fluxes, such as fluorspar and mill scale, or lime in the form of dicalcium ferrite, are often added to the slag.

The suggestion has been made to replace part of the lime charge to a basic steel-making furnace with dolomite (see, for example, Pat. No. 3,288,592). Dolomite, which contains an approximately equimolar proportion of calcium and magnesium (i.e. $CaO \cdot MgO$ on a calcined basis) has several beneficial features which theoretically should make it more attractive than lime. For example, calcined dolomite has a melting point of about 2300° C. which, although it is still above steel-making temperatures, is about 300° C. below that of lime, and magnesium has a smaller ionic radius than calcium which should enable it to diffuse through the slag more readily than the latter. However, an important advantage of dolomite over lime is in connection with the basic steel-making furnace's refractory lining, which is commonly made of tar- or pitch-impregnated bricks high in dense magnesia which has been fired well over 1600° C. The slags generated in the basic steel-making furnace are extremely corrosive to the lining. When silicon becomes oxidized in the early part of the heat, the silica reacts readily with the magnesia in the lining, and experience has shown that appreciable loss in basic refractory linings occurs during the first few minutes following the oxidation of the silicon. If lime alone is present in the slag, the silica has no magnesia to react with except that in the refractory lining. If dolomite is present in the slag, the silica would be expected, based on well-known chemistry, to attack the magnesia therein with little effect on the magnesia in the refractory lining. Another advantage in using dolomite over lime is that dolomite should be less expensive than lime since less materials is needed to combine with the acidic components of the slag due to the lower molecular weight of MgO as compared with $\overline{C}aO$.

In spite of the foregoing advantages in the use of dolomite, that material has not gained wide acceptance for use in basic steel-making furnaces. It has been claimed that the MgO in the dolomite produces an undesirable, viscous slag (see, for example, Pat. 3,288,592 referred to above). One possible explanation, according to that patent, for this thickening is the development of a beta phase of MgO, commonly known as periclase, which is a very dense, refractory form of magnesium oxide. Because the melting points of lime and dolomite are above the steel-making temperatures, the material must first form a lower melting phase before it can go into solution in the slag. Calcium oxide readily reacts with iron oxide to form dicalcium ferrite which has a melting point below steel-making temperatures. Magnesium oxide, on the other hand, lacking good slag mixing, reacts somewhat less readily, and it is believed that this sluggishness permits some of the magnesia to be converted into the periclase form which is inactive and forms large crystals tending to thicken the slag.

Another aspect of the steel-making process is the desire, for economic reasons, to utilize waste forms of iron oxide, principally the iron oxide-rich dust reclaimed from the furnace stacks, as a source of iron.

Moreover, when the impurities of the hot metal (molten pig iron) are oxidized, some iron will be oxidized to the slag as FeO and $Fe_2O_3$. The slag will always contain some iron, i.e. from about 5 to about 40% of FeO and from about 1 to about 10% of $Fe_2O_3$. This iron is discarded with the slag resulting in a decrease in the metal yield based on the metallic charge. A yield of only 85% is not uncommon. If, on the other hand, the iron necessary for slag equilibrium is supplied by adding a waste iron-oxide rich dust, less iron would be removed from the metallic charge resulting in an increase in metal yield based on the usual charge materials.

Because of the difficulty in handling and charging this fine dust in many cases the dust is simply discarded resulting in a disposal problem. It has been suggested that the dust be formed into larger shaped bodies, such as pellets, nodules or briquettes. To improve the strength or hardness of such bodies it has been suggested to coat the bodies with a small amount of lime or dolomite (see, for example, patents 2,806,776 and 2,806,777) and to heat the material to form calcium ferrite or calcium-magnesium ferrites on the surface. It has also been suggested to mix with a silica-rich low grade iron ore concentrate, lime or dolomite to react, upon sintering, with the silica to form a slag binding the iron ore particles into a rugged body for charging to a furnace (see, for example, patent 2,990,268).

It is the principal object of the present invention to provide an improvement in basic steel-making technology enabling the utilization of dolomite, with its advantages, as a basic slag-forming ingredient, without the limitations and disadvantages heretofore encountered in the use of dolomite.

It is another object of the present invention to provide in a basic steel-making process, for the use of dolomite, as a basic slag-forming ingredient, wherein the magnesia component rapidly dissolves in the slag.

Still another object of the present invention is to provide an improvement in the basic steel-making process which provides shorter heat times; increased refractory lining life, and improved phosphorous and sulfur removal while maintaining equal, if not better, removal of silica and manganese than is presently achieved by this process.

A further object of the present invention is to provide an improvement in basic steel-making processes wherein higher quantities of magnesia may be incorporated in the slag without encountering the thickening problems referred to above.

A specific object of the present invention is to provide an improvement in basic steel-making processes wherein waste iron oxide-rich dust may be utilized as part of the charge.

A further specific object of the present invention is to provide an improvement in basic steel-making processes wherein waste iron oxide-rich dust may be utilized to provide iron necessary for slag equilibrium thereby increasing metal yield based on normal charge materials.

Another principal object of the present invention is to provide novel compositions containing or derived from dolomite and iron oxide, for addition to a basic steel-making furnace to achieve one or more of the objects referred to above.

Other objects, including a method for making the novel compositions, will become apparent from a consideration of the following specification and claims.

Summary of the Invention:

The present invention comprises, in a basic steel-making process wherein dolomite is charged to the furnace as a basic slag-forming ingredient, the improvement wherein dolomite, before being charged, is intimately mixed, in finely-divided form, with finely-divided iron oxide in a proportion of iron oxide equivalent to that theoretically required stoichiometrically for combination, as $Fe_2O_3$, with the calcia portion of the dolomite as dicalcium ferrite and with at least a substantial part of the magnesia portion of the dolomite as magnesio ferrite and the mixture is formed into shaped bodies. These shaped bodies may be added as such as at least part of the flux charge to the furnace. In one embodiment, the shaped bodies of the stated mixture of dolomite and iron oxide are heated to pre-react the dolomite and iron oxide to form at least dicalcium ferrite in the shaped bodies and these pre-reacted bodies are charged to the furnace.

The compositions provided by the present invention for charging to the basic-steel-making furnace are in the form of shaped bodies, i.e. briquettes, pellets or nodules, and will consist essentially of either (1) an intimate mixture of dolomite and iron oxide in the stated ratio, or (2) a pre-reacted intimate mixture of dolomite and iron oxide containing dicalcium ferrite or dicalcium ferrite and magnesio ferrite.

Regardless of the form in which the mixture in the shaped bodies is when charged to the furnace, the components are in a state which either are or will quickly become highly reactive with the slag. The pre-reacted forms are in a transition state, in the midst of phase changes, making them highly reactive. The unreacted form quickly achieves this state upon addition to the furnace.

Reference has been made herein to the use of dolomite. Dolomitic limestone is a natural, intimate molecular mixture of calcium carbonate ($CaCO_3$) and magnesium carbonate ($MgCO_3$). The two carbonates are in an approximately 1:1 molar ratio, the exact proportion ranging, depending upon source, from about 40 to about 60% of each on a molar basis. The calcia and magnesia components of dolomite are in very intimate association in alternating layers on the order of one to a few molecules in thickness. Thus, dolomite (carbonate, oxide or hydrate) has its own intrinsic properties which differ from a simple physical mixture of calcium carbonate (or oxide or hydrate) and magnesium carbonate (or oxide or hydrate). Generally speaking, the dolomite used in accordance with the present invention may be in the form of a carbonate

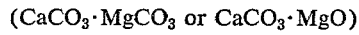

($CaCO_3 \cdot MgCO_3$ or $CaCO_3 \cdot MgO$)

oxide (calcined $CaO \cdot MgO$) or hydrate (monohydrate, $Ca(OH)_2 \cdot MgO$ or dihydrate, $Ca(OH)_2Mg(OH)_2$), and, hence, the term "dolomite" as used herein, without further qualification, will be understood to include any of these forms. However, as will appear hereinafter, there are particular situations where one form is preferred over another. The dolomite used will be finely-divided, generally through a 10 mesh screen (Tyler). If the starting dolomite is in oxide or hydrate form it will normally be sufficiently finely-divided. The carbonate form may be ground.

As stated, the present invention is based upon a combination of dolomite and iron oxide; the ultimate reactions involving the $CaO \cdot MgO$ of the dolomite and $Fe_2O_3$. In accordance with the broader aspects of the invention, the iron oxide employed initially may be in the form of $Fe_2O_3$, Fe₃O₄ of FeO, or combinations of two or more of these, since, upon heating in air or oxygen the transition phase, Fe₂O₃ will result. For economic reasons, it is preferred that the iron oxide be in the form of a waste, finely-divided iron oxide-rich dust, such as the dust reclaimed from steel-making furnace stacks. The principal form of iron oxide in such dust is Fe₂O₃ which represents the preferred form of iron oxide for utilization in accordance with the present invention. The dust, of course, will have an extremely fine particle size. In any event, the iron oxide used will be finely-divided, generally through a 10 mesh screen (Tyler).

Analyses of typical iron oxide-rich dusts are as follows:

TABLE I

|   | Percent | | |
|---|---|---|---|
|   | A | B | C |
| Fe₂O₃ | 90 | 80.94–90.63 | 88.0–92.0 |
| SiO₂ | 3.25–3.75 | 0.85–1.40 | 0.6 |
| C | 2.5–3.5 | | |
| Al₂O₃ | 0.1–0.3 | 0.3–0.8 | 0.4 |
| CaO | Trace | 0.9–1.5 | 0.9 |
| MgO | Trace | 0.3–0.8 | 0.6 |
| Zn | | | 0.5 |
| S | | | 0.6–0.9 |

In accordance with the present invention, the minimum proportion of iron oxide mixed with the dolomite is that theoretically required stoichiometrically to combine, as Fe₂O₃, with the calcia portion of the dolomite as dicalcium ferrite, 2CaO·Fe₂O₃, and with at least a substantial portion, preferably at least the major portion, of the magnesia portion of the dolomite as magnesio ferrite, MgO·Fe₂O₃. This is by way of describing proportions only, since it should be clear that no such reaction need actually take place. In one pre-reaction embodiment wherein the dolomite and iron oxide are reacted to form essentially dicalcium ferrite and magnesio ferrite

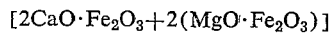
[2CaO·Fe₂O₃+2(MgO·Fe₂O₃)]

the iron oxide will be in an amount at least stoichiometrically required to satisfy both the calcia and magnesia portions of the dolomite. Excess iron oxide may be used. Expressed in terms of percentages, by weight, of iron oxide (calculated as Fe₂O₃) based on a mixture of Fe₂O₃ and CaO·MgO, the iron oxide will generally make up at least about 50% preferably at least about 60%, of such mixture and may go up to about 80%, of such mixture. Expressed on this basis, such a mixture containing about 71% of Fe₂O₃ is the stoichiometric balance to provide 3 atoms of Fe for each molecule of dolomite to give [2CaO·Fe₂O₃+2(MgO·Fe₂O₃)] from

2(CaO·MgO)+3Fe₂O₃

As stated, the mixture of dolomite and iron oxide, formed into shaped bodies, may be added as such, without pre-reaction, to the furnace. In this case, the dolomite may be in carbonate form if to be added to an open hearth furnace, or in oxide (calcined) form if to be added to a basic oxygen furnace or electric furnace. Dispensing with pre-reaction eliminates the expense of that step. On the other hand, in the case where the oxide is desired, through pre-reaction, the dolomitic carbonate can be utilized instead of the oxide since the carbonate form undergoes calcination while becoming pre-reacted. Pre-reaction also eliminates the problem of hydration of the CaO portion of the calcined dolomite. In the case of shaped bodies containing calcined dolomite, hydration can lead to decrepitation of the bodies when stockpiled or stored under ambient atmospheric conditions for prolonged periods of time. In forming shaped bodies of the dolomite and iron oxide which are not to be pre-reacted, conventional techniques for briquetting, pelletizing, extruding and the like, may be used, including the use of binders, like molasses, starches and lignins.

On the other hand, as stated, the mixture of dolomite and iron oxide may be formed into shaped bodies, as described above, and pre-reacted by heating. If FeO or Fe₃O₄ is used, this heating should be in the presence of oxygen (including air) to insure the formation of Fe₂O₃ for reaction. Reducing conditions are not desirable during heating. Various stages of the reaction are evident upon subjecting shaped bodies of the stated mixture to different temperatures, cooling and analyzing the product by X-ray diffraction and petrographic techniques the first stage (after conversion of any carbonate to oxide) occurs as the temperature of heating is increased with the formation of dicalcium ferrite, the MgO and residual iron oxide remaining substantially unreacted. The exact temperature at which this begins varies depending upon the particular proportions of dolomite and iron oxide used and the extent and nature of impurities therein. However, it is generally in the neighborhood of about 1100° C. Since this conversion to essentially dicalcium ferrite, MgO and iron oxide is relatively easy to achieve on a commercial scale, and the lowest temperature at which pre-reaction and sintering occur, it represents one of the preferred of the preaction embodiments. In addition, the calcium, as a result of the formation of dicalcium ferrite, is in a highly reactive state but is no longer susceptible to hydration. Moreover, there is no overburned-versus-underburned problem in view of the state of the calcium and since the temperature is below that necessary for over burning of magnesia. It should also be noted that magnesia, although unreacted with the iron oxide, is not susceptible to hydration under atmospheric conditions. The dolomite used may be, and preferably is, in carbonate form since it becomes completely calcined during the heating operation, thus having the time and expense of pre-calcining the dolomite before mixing with the iron oxide. Moreover, the carbonate form represents the lowest cost form of dolomite available.

As the heating temperature increases, the MgO and remaining iron oxide begin to react to form magnesio ferrite and eventually a point is reached when the product, where stoichiometric proportions of dolomite and iron oxide have been used, consists essentially of dicalcium ferrite and magnesio ferrite. This represents another of the preferred pre-reaction embodiments. Here again, the exact temperature may vary, but is generally in the neighborhood of 1250–1290° C. During formation of magnesio ferrite crystals, which may begin to form as low as slightly over 1125° C., the crystals of dicalcium ferrite increases in size and amount until a point is reached where the body is essentially dicalcium ferrite and magnesio ferrite crystals. Sintering also occurs in this embodiment resulting in a strong and rugged body.

Obviously, as the heating continues from the stage where the material is essentially dicalcium ferrite, MgO and iron oxide to the stage where the material is essentially dicalcium ferrite and magnesio ferrite, there is an intermediate situation where the material contains dicalcium ferrite, magnesio ferrite, MgO and iron oxide. This is also a preferred form of pre-reaction embodiment.

As the temperature of heating is further increased, the crystalline dicalcium ferrite X-ray peaks decrease slightly in their relative intensities. Eventually a point is reached, in the general neighborhood of about 1320° C., where the dicalcium ferrite forms a liquid encompassing the magnesio ferrite crystals, as shown by the disappearance of the X-ray peaks for dicalcium ferrite in the quenched material. Upon slower cooling, the dicalcium ferrite will recrystallize along with the magnesio ferrite. With further increase in temperature, the magnesio ferrite undergoes a phase change to magnesio wüstite (MgO.FeO). The principal disadvantage of this embodiment, aside from the higher temperatures required, is the fusion or melting which takes place and which can result in the bodies losing their shape and sticking together to form objectionable large clinkered masses of the product. Heating to temperatures above this level is unnecessary and, in fact, is undesirable since magnesio wüstite begins to form.

As shown above, when dolomite calcium oxide and magnesium oxide are in intimate contact with $Fe_2O_3$, several phase and compositional changes take place upon heating. It is during these changes that the calcium and magnesium oxide are very active, rapidly reacting with the acid ingredients of the slag resulting in the early formation of a basic slag. This early formation of a basic slag is a prerequisite for efficient sulfur and phosphorous removal. These slag reactions take place, whether the prereacted material or the unreacted mixture of dolomite and iron oxide is charged to the furnace, before formation of magnesio wüstite can occur. This phase is less active and if given sufficient time with a minimum of slag mixing as, for example, would be found in the open hearth, normal grain growth would produce large crystals which could make for a viscous slag.

In the foregoing pre-reaction embodiments, the shaped bodies may simply be heated as by hot gases, electrically, or the like, in conventional sintering strands, calcimatic kilns, rotary kilns, shaft kilns, tunnel kilns, multiple hearth furnaces, and the like. The compactness of the unfired bodies may dictate the type of heating employed. As stated previously, atmosphere conditions during heating will be controlled to oxidize FeO or $Fe_3O_4$ to $Fe_2O_3$ (oxidizing) or to prevent significant reduction of $Fe_2O_3$ (neutral or oxidizing).

The composition of the present invention, whether in unreacted or pre-reacted form, may be added, as partial or complete replacement of the normal flux charge, to any basic steel-making furnace. It is especially applicable to modern rapid steel-making operations, such as basic oxygen steel-making, spray steel-making, electric steel-making, and the like.

The X-ray diffraction pattern of the dicalcium ferrite-magnesio ferrite of this invention is as follows (using a copper X-ray tube with a wave length of 1.54178 A. and with a nickel filter):

TABLE II

| d. A. | d A | d A |
|---|---|---|
| 7.36 | 2.18 | 1.59 |
| 5.20 | | |
| 4.83 | | |
| 3.88 | 2.09 | 1.55 |
| | | 1.54 |
| 3.68 | 2.07 | 1.52 |
| 3.05 | 1.94 | 1.48 |
| | 1.90 | 1.46 |
| | | 1.43 |
| 2.97 | 1.88 | 1.38 |
| | | 1.36 |
| | | 1.34 |
| 2.78 | 1.84 | 1.32 |
| | | 1.28 |
| 2.71 | 1.74 | 1.12 |
| 2.67 | 1.71 | 1.09 |
| | 1.66 | |
| 2.60 | 1.62 | 1.04 |
| | | .98 |
| | | .96 |
| 2.53 | 1.61 | .93 |
| | | .89 |
| 2.35 | | .88 |
| 2.22 | | .85 |
| | | .82 |
| | | .81 |
| | | .76 |
| | | .75 |

The following specific examples are given for the purpose of illustration only and are not intended to limit the scope of the invention in any way:

Example I

An iron oxide-rich waste dust having the analysis under C in Table I is mixed, respectively, with dolomite (carbonate form), calcined dolomite, dolomite dihydrate and dolomite monohydrate, in all cases in proportions equivalent to 3 mols of $Fe_2O_3$ to 2 mols of dolomite. All the dolomite materials have a particle size —10 mesh (Tyler).

Each of the mixtures is dry pressed into pellets 1¼ inch in diameter x 1 inch long. The pellets prepared from the dolomite in carbonate form are dried at about 200–400° C. for 1–24 hours. All of the pellets are then placed in an electric furnace at 1290° C. for 20–25 minutes. The pellets are removed and allowed to cool. Upon being subjected to X-ray diffraction technique, all pellets show the presence of dicalcium ferrite and magnesio ferrite but no CaO, MgO or $Fe_2O_3$. The materials have the X-ray data as set forth in Table II above.

Example II

The procedure of Example I was repeated wherein, however, the pellets are heated at 1310° C. where some liquid phase is seen to be present, but the pellets retain their form. It is found that the X-ray peaks of the calcium ferrite phase decreased in relative intensity whereas the X-ray peaks for the magnesio ferrite increased in relative intensity. However, the product has essentially the same d spacings as set forth in the above Table II. Petrographic examination shows the presence of some non-crystalline dicalcium ferrite surrounding magnesio ferrite crystals.

Example III

The procedure of Example I was repeated wherein, however, the pellets were heated at 1320° C., where they begin to exhibit some flow. It is found that the X-ray peaks of the dicalcium ferrite are not present whereas the X-ray peaks of the magnesio ferrite have increased in relative intensity. No CaO, MgO or $Fe_2O_3$ peaks as such are found.

Example IV

Finely-divided $Fe_3O_4$ is mixed with calcined dolomite in the ratio of 1 mol of $Fe_3O_4$ per mole of CaO·MgO. The mixture is pressed into pellets as in Example I above and heated to 1290° C. The resulting product is found to have essentially the same X-ray pattern as in Table II.

Example V

Pig iron (30 grams) is melted in a fully dense magnesia crucible at about 1500° C. in the presence of air. One pellet (1½ inch x 1 inch) of dolomitic ferrite prepared as in Example I is pre-heated to 900° C. (pre-heating not necessary in commercial size furnace) and then dropped onto the top of the molten pig iron. In about 15 seconds, the dolomitic ferrite pellet begins to react. The material is allowed to stand at temperature for 15 minutes following which the furnace is shut off, and the molten material is allowed to cool within the furnace. The solidified material, in the crucible, ais cut lengthwise. Examination shows good mixing of the dolomitic ferrite with the iron.

Example VI

The procedure of the preceding example is followed except that the pellet is not pre-reacted prior to addition to the molten iron. The results are essentially the same as in the preceding example.

Examples VII–IX

Three different mixtures are made using the iron oxide dust of Example I and —20 mesh calcined dolomite, CaO·MgO, prepared by calcining dolomite at 1200° C. for 12 hours. Each combination is dry mixed for 2 hours, dry pressed into pellets as in Example I which are dried for 2 hours at 300° C. Samples of pellets of each mix are heated in an electric furnace at temperature levels of 1100, 1200, 1285 and 1320° C. for 20 minutes, removed from the furnace and permitted to cool in the air. X-ray analyses are made for each mix subjected to each temperature level.

The mixtures are as follows:

VII 84%, by weight, iron oxide dust; 16% calcined dolomite

VIII 74%, by weight, iron oxide dust; 26% calcined dolomite

IX 64%, by weight, iron oxide dust; 36% calcined dolomite

The results are as follows:

VII At 1100° C. the beginning of X-ray peaks for dicalcium ferrite are found; at 1200° C. the dicalcium ferrite peaks have increased in intensity with some peaks for magnesio ferrite developing: at 1285° C. only magnesio ferrite X-ray peaks are found, and at 1320° C. dicalcium ferrite and magnesio ferrite peaks are found with a trace of magnesio wüstite.

VIII At 1200° C. the peaks for dicalcium ferrite are more intense than in VII; at 1285° C., dicalcium ferrite and magnesio ferrite peaks are found. At 1320° C., the peaks for dicalcium ferrite have decreased in relative intensity whereas the peaks for magnesio ferrite have increased in intensity.

IX At 1200° C., the peaks for dicalcium ferrite are about the same as in VIII; at 1285° C., peaks for dicalcium ferrite, iron oxide, MgO and magnesio ferrite are found, and at 1320° C., peaks for only magnesio ferrite are found.

Example X

A typical slag composition composed of 40% FeO (prepared by heating iron and $Fe_2O_3$ at 1350° C.); 30% CaO and 30% $SiO_2$, is heated in fully dense magnesia crucibles in an induction furnace at 1600° C. under an argon atmosphere. Into the molten slag in the crucibles are dropped pellets (¼" x 1") of dry-pressed: (a) CaO; (b) calcined dolomite CaO·MgO, and (c) dicalcium ferrite—magnesio ferrite—as prepared in Example I. After about 30 seconds, the crucibles are removed from the furnace and quenched. The crucibles and their solid contents are cut into sections and the exposed sections are polished and examined petrographically. The specimens to which the dicalcium ferrite-magnesio ferrite had been added showed that the material had completely dissolved in the slag. The specimens to which the CaO and the calcined dolomite had been added showed that the CaO pellets and the calcined dolomite pellets were still present in the original shape and showing no signs of rapid dissolution in the slag although they had become darker in color due to some penetration of iron.

Example XI

By way of contrast with the preceding examples, CaO and MgO (−10 mesh) and reagent grade $Fe_2O_3$ (−100 mesh) are mixed in proportions corresponding to 3 mols of $Fe_2O_3$ for each 2 mols of CaO and MgO, the mixture is pressed into pellets and heated at 1290° C. Analysis shows that only CaO has reacted to form calcium ferrite, the MgO remaining essentially unreacted. In a few days storage, some unreacted CaO has hydrated, and the pellet has disintegrated.

The general operating schedule for a typical basic oxygen furnace heat calls for the addition of the high calcium lime flux immediately after the oxygen blow has begun and ignition has taken place, although it can be added at any time during the heat cycle or spread out over any portion of the cycle. The composition of this invention may likewise be added at any time during the cycle or its addition may be spread out during any portion of the cycle. However, the preferred time of addition is immediately after the oxygen blow has begun and ignition has taken place.

Table III sets forth selected material balances in a basic oxygen furnace for heats using different ratios of high calcium lime versus a preferred composition of the present invention for an operation designed to produce approximately 150 tons/heat. The charge per heat is based on 120.7 tons of hot metal (molten pig iron) containing 1.49% Si, 0.277% Mn, 0.034% S, 0.090% P and 4.25% C; and 51.7 tons of No. 1 grade scrap (total metal charge—172.4 tons). For simplicity of calculations the scrap and high calcium lime charges as well as the compositions of the present invention are assumed to contain 0.0% $SiO_2$.

TABLE III

| Relative sources of basic constituents, CaO+MgO: Weight percent of high calcium lime | 100 | | 75 | | 50 | | 25 | | 0 | |
|---|---|---|---|---|---|---|---|---|---|---|
| Weight percent of dolomite from present composition | 0 | | 25 | | 50 | | 75 | | 100 | |
| | Pounds | Pound moles | Pounds | Pound moles | Pounds | Pound moles | Pounds | Pound moles | Pounds | Pound moles |
| High calcium lime charge [1] | 23,092 | 411.6 | 17,319 | 308.7 | 11,546 | 205.8 | 5,773 | 102.9 | 0 | 0 |
| Composition of present invention (70% $Fe_2O_3$+ 30%CaO:MgO, by wt.) [2] | 0 | 0 | 16,533 | 24.6 | 33,067 | 49.2 | 49,597 | 73.8 | 66,130 | 98.4 |
| CoO+MgO balance: | | | | | | | | | | |
| CaO from high calcium lime charge | 23,092 | 411.6 | 17,319 | 308.7 | 11,546 | 205.8 | 5,773 | 102.9 | 0 | 0 |
| CaO+MgO from present composition dolomitic charge [3] | 0 | 0 | 4,960 | 102.9 | 9,920 | 205.8 | 14,879 | 308.7 | 19,839 | 411.6 |
| MgO chemically dissolved from furnace lining | 2,015 | 50 | 1,008 | 25 | Trace | | Trace | | Trace | |
| Total CaO+MgO | 25,107 | 461.6 | 23,287 | 436.6 | 21,466 | 411.6 | 20,652 | 411.6 | 19,839 | 411.6 |
| $SiO_2$ balance: | | | | | | | | | | |
| Total: $SiO_2$ from hot metal | 7,698 | 128.1 | 7,698 | 128.1 | 7,698 | 128.1 | 7,698 | 128.1 | 7,698 | 128.1 |
| $Al_2O_3$ and miscellaneous balance: | | | | | | | | | | |
| Total: $Al_2O_3$ and misc. from hot metal | 5,300 | 85.1 | 5,300 | 85.1 | 5,300 | 85.1 | 5,300 | 85.1 | 5,200 | 85.1 |
| Sub-total less iron oxides | 38,105 | 674.8 | 36,285 | 649.8 | 34,464 | 624.8 | 33,650 | 624.8 | 32,827 | 624.8 |
| Iron oxide balance: [4] | | | | | | | | | | |
| $Fe_2O_3$ in slag | 4,104 | 25.7 | 3,945 | 24.7 | 3,801 | 23.8 | 3,801 | 23.8 | 3,801 | 23.8 |
| FeO in slag | 11,058 | 153.8 | 10,648 | 148.1 | 10,239 | 142.4 | 10,239 | 142.4 | 10,239 | 142.4 |
| Total FeO and $Fe_2O_3$ | 15,162 | 179.5 | 14,593 | 172.8 | 14,040 | 166.2 | 14,040 | 166.2 | 14,040 | 166.2 |
| Total slag | 53,267 | 854.3 | 50,878 | 822.6 | 48,504 | 791.0 | 47,690 | 791.0 | 46,877 | 791.0 |
| Iron in slag: | | | | | | | | | | |
| Total Fe in slag | 11,460 | 204.9 | 11,029 | 197.5 | 10,612 | 190.0 | 10,612 | 190.0 | 10,612 | 190.0 |
| Iron from composition of present invention: Total Fe from composition of preent invention | 0 | 0 | 8,094 | 144.9 | 16,189 | 289.9 | 24,282 | 434.8 | 32,376 | 579.7 |
| Change in iron conetnt of the slag and metal in order to maintain equlibrium: | | | | | | | | | | |
| Loss (−) of Fe to slag from metal | −11,460 | −204.9 | −2,935 | −52.6 | 0 | 0 | 0 | 0 | 0 | 0 |
| Gain (+) of Fe to metal from slag | 0 | 0 | 0 | 0 | +5,577 | +99.9 | +13,670 | +244.8 | +21,764 | +389.7 |

TABLE III—Continued

| Relative sources of basic constituents, CaO+MgO: | | | | | | | | | | |
|---|---|---|---|---|---|---|---|---|---|---|
| Weight percent of high calcium lime | 100 | | 75 | | 50 | | 25 | | 0 | |
| Weight percent of dolomite from present composition | 0 | | 25 | | 50 | | 75 | | 100 | |
| | Pounds | Pound moles | Pounds | Pound moles | Pounds | Pound moles | Pounds | Pound moles | Pounds | Pound moles |
| Ingot yield based on metallic charge only: | | | | | | | | | | |
| Increase in yield in pounds | 0 | | 8,525 | | 17,037 | | 25,130 | | 33,224 | |
| Increase in yield in tons | 0 | | 4.262 | | 8.518 | | 12,565 | | 16,612 | |
| Precent Yield tons yield×100 | 87.0 | | 89.5 | | 91.9 | | 94.3 | | 96.6 | |
| | 172.4 | | | | | | | | | |

[1] This value is based on a V ratio, i.e., CaO/SiO₂ equalling 3.0 by weight. Slight modifications may be necessary in order to compensate for other possible SiO₂ sources such as, from the scrap, high calcium lime and preconditioned dolomitic lime charges.

[2] Either unreacted or prereacted.

[3] From a molecular weight standpoint, CaO+MgO weights less than 2CaO (96.4 vs. 112.16). Therefore less CaO+MgO is required by weight to yield the same amount of moles for a given weight of CaO.

[4] These figures were derived by assuming that the slag will approach equilibrium in regard to its iron oxide content. Using a final carbon content of .058% for the blown metal, a figure of 21.0 mole percent iron oxide in the slag was obtained (McBride D. L. "Physical Chemistry of Oxygen Steelmaking." J. Metals 1960, (p. 531). This corresponds to 18 mole percent FeO and 3 mole percent Fe₂O₃.

Additions of the present composition may influence the heat requirement of the system. This is dependent in part on the degree to which the ferrite reaction has been accomplished. It will also depend on such variables as the amount of hot metal scrap, impurities and the like in the system. In those cases where there may be a deficiency of heat, adjustments may be made in several ways. For instance, by increasing the hot metal, or through the addition of exothermic materials, or by other suitable means.

Modification is possible in the selection of particular materials and in amounts thereof as well as in the particular materials and in amounts thereof as well as in the particular techniques employed without departing from the scope of the invention.

What is claimed is:

1. In the basic steel-making process, the improvement which comprises adding to the basic steel-making furnace as a basic slag-forming ingredient shaped bodies consisting essentially of a substantially homogeneous mixture of dolomite and iron oxide, the proportion of iron oxide being equivalent to that theoretically required stoichiometrically for combination, as $Fe_2O_3$, with the calcia portion of the dolomite as dicalcium ferrite and with at least a substantial portion of the magnesia portion of the dolomite as magnesio ferrite.

2. The method of claim 1 wherein said iron oxide is in a proportion equivalent to that theoretically required stoichiometrically for combination, as $Fe_2O_3$, with the calcia portion of the dolomite as dicalcium ferrite and with at least the major part of the magnesia portion of dolomite as magnesio ferrite.

3. The method of claim 2 wherein said shaped bodies are heated to react said iron oxide and said dolomite at least to form dicalcium ferrite.

4. The method of claim 1 wherein the proportion of iron oxide, calculated as $Fe_2O_3$, in said mixture is from about 50 to about 80%, by weight, based on a mixture of $Fe_2O_3$ and $CaO \cdot MgO$.

5. The method of claim 4 wherein said shaped bodies are heated to react said iron oxide and said dolomite at least to form dicalcium ferrite, magnesio ferrite or both dicalcium ferrite and magnesio ferrite.

6. The method of claim 4 wherein said proportion of iron oxide, calculated as $Fe_2O_3$, is at least about 60%.

7. The method of claim 6 wherein said proportion of iron oxide, calculated as $Fe_2O_3$, is about 70%.

8. The method of claim 1 wherein said shaped bodies are heated to react said iron oxide and said dolomite at least to form dicalcium ferrite.

9. The method of claim 8 wherein said bodies are heated to a temperature of from about 1100° C. to below the temperature at which any substantial amount of magnesio wüstite is formed.

10. The method of claim 9 wherein said bodies are heated to a sintering temperature.

11. In the basic oxygen and electric furnace steel-making processes, the improvement which comprises adding to the basic steel-making furnace as a basic slag-forming ingredient shaped bodies consisting essentially of a substantially homogeneous mixture of calcined dolomite and iron oxide, the proportion of iron oxide being equivalent to that theoretically required stoichiometrically for combination, as $Fe_2O_3$, with the calcia portion of the dolomite as dicalcium ferrite and with at least a substantial portion of the magnesia portion of the dolomite as magnesio ferrite.

12. The method of claim 11 wherein said iron oxide is in a proportion equivalent to that theoretically required stoichiometrically for combination, as $Fe_2O_3$, with the calcia portion of the dolomite as dicalcium ferrite and with at least the major part of the magnesia portion of the dolomite as magnesio ferrite.

13. The method of claim 12 wherein said shaped bodies are heated to react said iron oxide and said dolomite at least to form dicalcium ferrite.

14. The method of claim 11 wherein the proportion of iron oxide, calculated as $Fe_2O_3$, in said mixture is from about 50 to about 80%, by weight, based on a mixture of $Fe_2O_3$ and $CaO \cdot MgO$.

15. The method of claim 14 wherein said bodies are heated to react said iron oxide and said dolomite at least to form dicalcium ferrite, magnesio ferrite or both dicalcium ferrite and magnesio ferrite.

16. The method of claim 14 wherein said proportion of iron oxide, calculated as $Fe_2O_3$, is at least about 60%.

17. The method of claim 16 wherein said proportions of iron oxide, calculated as $Fe_2O_3$, is about 70%.

18. The method of claim 11 wherein said shaped bodies are heated to react said iron oxide and said dolomite at least to form dicalcium ferrite.

19. The method of claim 18 wherein said bodies are heated to a temperature of from about 1100° C. to below the temperature at which any substantial amount of magnesio wüstite is formed.

20. The method of claim 19 wherein said bodies are heated to a sintering temperature.

References Cited
UNITED STATES PATENTS

| | | | |
|---|---|---|---|
| 2,159,977 | 5/1939 | Nicholas | 75—94 X |
| 3,072,575 | 1/1963 | Gorter et al. | 252—62.63 X |
| 3,163,519 | 12/1964 | Hanson et al. | 75—94 X |
| 3,519,471 | 7/1970 | Ban | 117—169 A |
| 3,519,386 | 7/1970 | Fedock et al. | 75—94 X |

HYLAND BIZOT, Primary Examiner

J. M. DAVIS, Assistant Examiner

U.S. Cl. X.R.

75—52, 55, 94; 252—62.5

UNITED STATES PATENT OFFICE
CERTIFICATE OF CORRECTION

Patent No. 3,726,665                  Dated April 10, 1973

Inventor(s) William H. Minnick

It is certified that error appears in the above-identified patent and that said Letters Patent are hereby corrected as shown below:

Col. 8, line 54, "ais" should read -- is --;
Col.10, line 37, "0.277%" should read -- 0.27% --;
Col.11, lines 31 and 32, delete "materials and in amounts thereof as well as in the particular";

Signed and sealed this 13th day of August 1974.

(SEAL)
Attest:

McCOY M. GIBSON, JR.                C. MARSHALL DANN
Attesting Officer                   Commissioner of Patents